(12) United States Patent
Hendry et al.

(10) Patent No.: US 6,890,478 B2
(45) Date of Patent: May 10, 2005

(54) OPEN MOLD MOLDING

(75) Inventors: James Hendry, Brooksville, FL (US); Gregory A. Homann, Canton, MI (US); David Turczynski, Highland, MI (US)

(73) Assignee: Lear Corporation, Southfield, MI (US)

( * ) Notice: Subject to any disclaimer, the term of this patent is extended or adjusted under 35 U.S.C. 154(b) by 114 days.

(21) Appl. No.: 10/250,280

(22) Filed: Jun. 20, 2003

(65) Prior Publication Data

US 2004/0188893 A1 Sep. 30, 2004

Related U.S. Application Data

(63) Continuation-in-part of application No. 10/249,237, filed on Mar. 25, 2003.

(51) Int. Cl.$^7$ .............................................. B29D 22/00
(52) U.S. Cl. ........................................ 264/572; 425/130
(58) Field of Search ........................... 264/572; 425/130

(56) References Cited

U.S. PATENT DOCUMENTS

| | | |
|---|---|---|
| 2,331,688 A | 10/1943 | Hobson |
| 2,345,144 A | 3/1944 | Opavsky |
| 2,714,747 A | 8/1955 | Lindemann |
| 2,714,748 A | 8/1955 | Stimemann |
| 3,021,559 A | 2/1962 | Strong |
| 3,044,118 A | 7/1962 | Bernhardt |
| 3,135,640 A | 6/1964 | Kepka |
| 3,687,582 A | 8/1972 | Hendry et al. |
| 3,966,372 A | 6/1976 | Yasuike et al. |
| 4,033,710 A | 7/1977 | Hanning |
| 4,078,875 A | 3/1978 | Eckardt |
| 4,082,226 A | 4/1978 | Appleman et al. |
| 4,091,057 A | 5/1978 | Weber |
| 4,092,389 A | 5/1978 | Sakurai |
| 4,101,617 A | 7/1978 | Friederich |
| 4,104,353 A | 8/1978 | Monnet |

(Continued)

FOREIGN PATENT DOCUMENTS

| | | |
|---|---|---|
| CA | 2125623 | 12/1994 |
| DE | 651 725 | 10/1937 |
| DE | 1194127 | 6/1965 |
| DE | 2 159 344 | 5/1972 |
| DE | 2 106 546 | 8/1972 |
| DE | 2651725 | 4/1978 |
| DE | 3444532 | 6/1986 |
| DE | 40 02 503 | 1/1990 |
| DE | 39 13 109 A1 | 10/1990 |
| DE | 40 33 298 | 5/1991 |
| DE | 43 34 012 | 10/1993 |
| DE | 195 31 709 A 1 | 3/1997 |
| DE | 10128458 | 2/2003 |
| EP | 0 289 230 | 11/1988 |
| EP | 0 309 182 | 3/1989 |
| EP | 0 309 257 | 3/1989 |
| EP | 0 321 117 | 6/1989 |
| EP | 0321117 | 6/1989 |
| EP | 0 402 730 | 6/1990 |
| EP | 0628395 | 6/1994 |
| EP | 0 950 493 | 10/1999 |
| FR | 1145411 | 10/1957 |

(Continued)

*Primary Examiner*—Suzanne E. McDowell
(74) *Attorney, Agent, or Firm*—Bill C. Panagos

(57) ABSTRACT

A method and system for producing thin walled plastic products with hollow rib members using gas-assisted plastic injection molding. The mold is allowed to open a predetermined distance as the gas is injected into the plastic material in the mold cavity. A plurality of post members, such as ejector pins, are located on a biased ejector frame and maintain their positions relative to the mold cavity in order to form solid portions or areas in the molded part.

11 Claims, 2 Drawing Sheets

U.S. PATENT DOCUMENTS

| | | |
|---|---|---|
| 4,106,887 A | 8/1978 | Yasuike et al. |
| 4,129,635 A | 12/1978 | Yasuike et al. |
| 4,136,220 A | 1/1979 | Olabisi |
| 4,140,672 A | 2/1979 | Kataoka |
| 4,208,368 A | 6/1980 | Egli |
| 4,234,642 A | 11/1980 | Olabisi |
| 4,247,515 A | 1/1981 | Olabisi |
| 4,255,368 A | 3/1981 | Olabisi |
| 4,333,608 A | 6/1982 | Hendry |
| 4,357,296 A | 11/1982 | Hafele |
| 4,474,717 A | 10/1984 | Hendry |
| 4,555,225 A | 11/1985 | Hendry |
| 4,601,870 A | 7/1986 | Sasaki |
| 4,604,044 A | 8/1986 | Hafele |
| 4,740,150 A | 4/1988 | Sayer |
| 4,781,554 A | 11/1988 | Hendry |
| 5,028,377 A | 7/1991 | Hendry |
| 5,069,858 A | 12/1991 | Hendry |
| 5,069,859 A | 12/1991 | Loren |
| 5,090,886 A | 2/1992 | Jaroschek |
| 5,098,637 A | 3/1992 | Hendry |
| 5,204,050 A | 4/1993 | Loren |
| 5,204,051 A | 4/1993 | Jaroschek |
| 5,423,667 A | 6/1995 | Jaroschek |
| 5,607,640 A | 3/1997 | Hendry |
| 5,656,234 A * | 8/1997 | Kaneishi et al. ............ 264/572 |
| 5,759,479 A | 6/1998 | Gotterbauer |
| 5,885,518 A | 3/1999 | Hendry |
| 5,928,677 A | 7/1999 | Gosdin |
| 6,019,918 A | 2/2000 | Guergov |
| 6,159,415 A | 12/2000 | Tanada |
| 6,354,826 B1 | 3/2002 | Thomas |
| 6,372,177 B1 | 4/2002 | Hildesson et al. |
| 6,375,892 B2 | 4/2002 | Thomas |
| 6,576,170 B1 | 6/2003 | Nunnery et al. |
| 6,579,489 B1 | 6/2003 | Thomas |
| 6,602,460 B2 | 8/2003 | Thomas et al. |
| 2003/0011110 A1 | 1/2003 | Pearson |
| 2003/0011111 A1 | 1/2003 | Pearson |

FOREIGN PATENT DOCUMENTS

| | | |
|---|---|---|
| FR | 2256021 | 7/1975 |
| GB | 1 460 101 | 12/1976 |
| GB | 1 487 187 | 9/1977 |
| GB | 2 100 661 | 1/1983 |
| GB | 2 122 130 | 1/1984 |
| GB | 2139548 | 11/1984 |
| GB | 2315050 | 1/1998 |
| JP | 50-74660 | 6/1975 |
| JP | 5714968 | 6/1975 |
| JP | 3009820 | 1/1991 |
| JP | 3-121820 | 5/1991 |
| JP | 4-62118 | 2/1992 |
| JP | 06155501 | 6/1994 |
| JP | 06297522 | 10/1994 |
| JP | 10291227 | 11/1998 |
| JP | 113333876 | 12/1999 |
| WO | WO 96/34731 | 11/1996 |

* cited by examiner

OPEN MOLD MOLDING

CROSS REFERENCE TO RELATED APPLICATIONS

This application is a continuation-in-part of U.S. patent application Ser. No. 10/249,237, filed Mar. 25, 2003.

BACKGROUND OF INVENTION

The present invention relates to plastic injection molding and more particularly to plastic injection molding using gas assist and the formation of hollow rib members on plastic injection molded parts.

In the plastic injection molding art, the usual challenges facing the product designer include designing an article having the requisite strength for the product application and satisfactory surface finish, as well as avoiding excessive weight, surface distortions, and increased cycle time. For flat or thin products, it is typical to include one or more rib members in the design to provide relative strength and structure for the molded article. The rib members are typically thicker than the molded article which increases the weight, material usage, and cycle time of the article, and often induces sink marks and other surface defects due to a thermal gradients in the area of the thickened section.

It is known in the plastic molding art to use pressurized gas, such as nitrogen, in conjunction with plastic injection molding of articles. Pressurized gas serves several purposes. The gas allows the article or rib structure to have hollow interior portions which result in savings in weight and material, thereby reducing costs. The pressurized gas also applies an outward pressure to force the plastic against the mold surfaces while the article solidifies. This helps provide a better surface on the molded article and also reduces or eliminates sink marks and other surface defects. The use of pressurized gas also reduces the cycle time as the gas is introduced and/or migrates to the most fluent inner volume of the plastic and replaces the plastic in those areas which would otherwise require an extended cooling cycle. The pressure of the gas pushing the plastic against the mold surfaces further increases the cooling effect of the mold on the part, thus solidifying the part in a faster manner and reducing the overall cycle time.

Large, flat thin products, such as computer housings, vehicle panels, roof panels, and the like, often require several elongated rib members to provide the requisite stiffness and stability for use of the products. It has been difficult however, to injection mold these products and achieve high quality and aesthetic surfaces. Also, the elongated rib members which are often thicker than the product itself, can produce sink marks on the visible surface of the products and are difficult to mold.

Where the rib members or other portions of the article in which the gas is being introduced are elongated, the pressure of the gas as it enters the mold cavity may rupture or blow out the plastic within the mold cavity, i.e. the gas is not contained within the plastic. Also, it is often difficult to have the gas migrate along the full length of an elongated, thicker plastic section, thus creating a product which has an uneven thickness and cooling cycle, and can lead to undesirable sink marks on the molded product and/or result in undesirable increased cycle times.

SUMMARY OF INVENTION

An object of the present invention is to provide an improved method of gas assisted injection molding. It is another object of the present invention to provide an improved method and system for injection molding plastic parts with structural rib members, particularly parts with large flat surfaces and supporting rib members.

It is a still further object of the present invention to provide a method and system for gas assist injection molding which eliminates the need for spillover cavities and the subsequent capture and regrinding of excess plastic material from a mold cavity.

In accordance with the objects of the present invention, a mold is provided with a number of post members positioned on a biased frame member. The post members can be ejector pins or the like which are positioned on an ejector frame. The core member of the mold is movable relative to the ejector pins and, during the molding process, is opened a predetermined amount in order to allow the desired migration of the gas through certain portions of the plastic material. The post members provide solid sections or areas in the molded part for the requisite rigidity.

A quantity of plastic material is first injected into the mold cavity. A shut off valve in the nozzle is then activated Thereafter, pressurized gas is introduced into the plastic material in the mold cavity. At substantially the same time, the mold is opened as the core member moves relative to the cavity member and the ejector pins (post members).

The gas flows throughout the plastic in the mold cavity except where the post members retain the original wall thickness. The areas where the post members are positioned form solid areas in the part which are necessary for part rigidity.

The mold can be opened a predetermined amount dependent on the injected gas pressure. When the desired mold open position is the gas pressure is reduced to stop any further opening. The gas pressure is then retained until the molding is cooled and solidified, i.e. is self supporting. Once the molding process is completed, the injected gas pressure is then relieved (vented or exhausted) from the formed article and the article is ejected or removed from the mold.

The above objects and other objects, features, and advantages of the present invention are readily apparent from the following detailed description of the preferred embodiments for carrying out the invention when taken in accordance with accompanying drawings.

DETAILED DESCRIPTION

The present invention is strictly suitable for producing plastic injection molded articles which have a wide surface area and minimum thickness. For such flat, thin products, it is typical to include one or more rib members in the design to provide relative strength and structure for the molded article. Since the rib members are typically thicker than the molded article, gas assist injection molding techniques are frequently utilized. These techniques decrease the material usage and cycle time of the manufacturing process, and prevent undesirable sink marks and other surface defects which often plague plastic injection molding processes.

The present invention has particular applicability, for example, for business machine covers, such as computer consoles, facsimile machines, etc., as well as vehicle roofs and hoods. With the present invention, these products or articles can be manufactured by plastic injection molding techniques in a faster and better manner.

Figure 1:
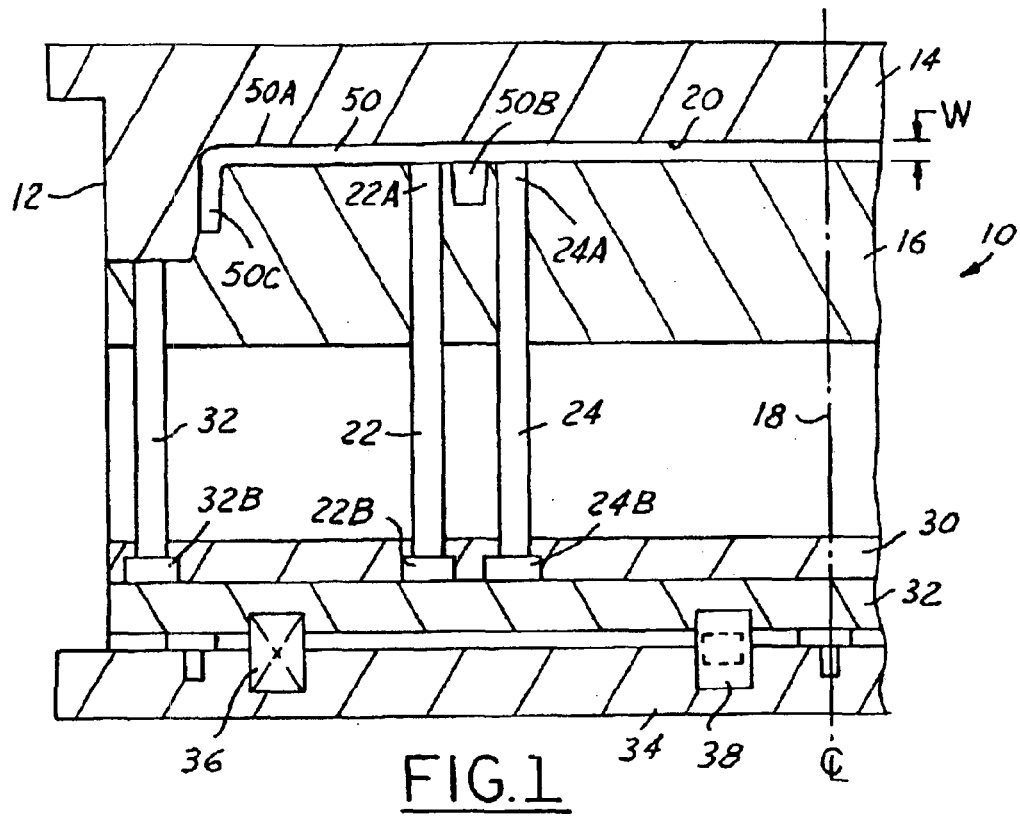
FIG. 1 is a schematic diagram of a mold in accordance with the present invention.

FIG. 1 illustrates one embodiment of a molding system 10 which can be utilized with the present invention. The molding system includes a mold 12 which has two halves, a cavity member 14 and a core member 16. A mold cavity 20 is formed between the two mold members 14 and 16. The mold cavity is formed in the precise shape and dimensions of the plastic article or part which is to be injection molded of a plastic material. For illustrative purposes, only one-half of the mold 12 is illustrated in the drawings. Two opposite halves of the mold are formed around the centerline 18.

A plurality of ejector pins 22 and 24 (a/k/a "post members") are provided in the molding system 10. There can be any number of ejector pins 22, 24 and the like spaced throughout the molding system 10. For illustrative purposes, only two pins 22 and 24, are shown in the drawings.

Figure 3:
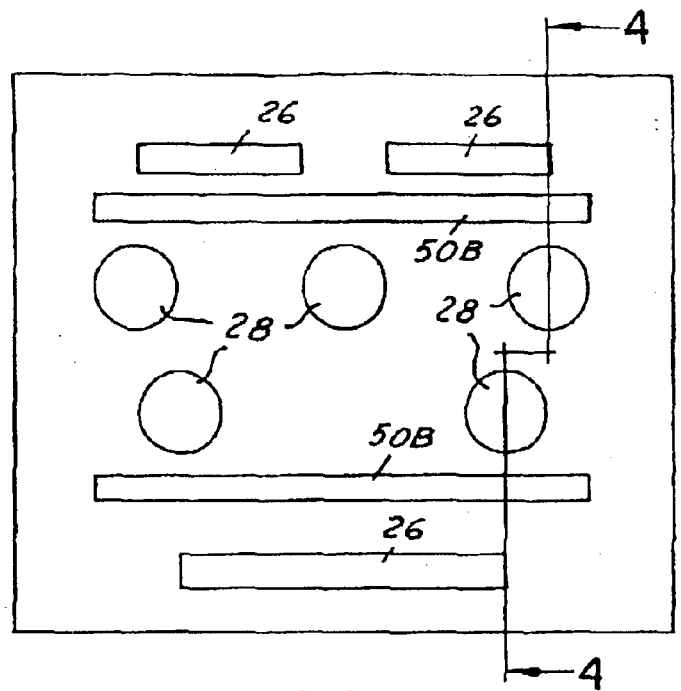
FIG. 3 is a schematic diagram of embodiments of post members utilizable with the present invention.

The ejector pins themselves, or at least their upper ends 22A and 24A, can have any desired cross-sectional size and shape, such as, for example, round or rectangular. For example, as shown in FIG. 3, the injector pins themselves, or the upper ends thereof, can be rectangular in shape 26 or circular in shape 28. As explained below, the upper ends of the ejector pins are utilized to form solid sections of the molded product in order to give the molding the required rigidity and stiffness.

Also, as conventional in molding systems, a number of guide or return pins 32 are provided in order to keep the two mold halves 14 and 16 in their proper aligned positions during the molding process.

The bottom or lower ends 22B and 24B of the ejector pins, as well as the bottom or lower ends 32B of the return pins are positioned in an ejector frame 30. The ejector frame 30 is positioned on a support or backing plate member 32. The ejector frame and backing plate are positioned above a structural support member 34. A plurality of biasing members 36 and 38 are positioned in machined pockets in the backing plate and support member. Any conventional type of biasing member can be utilized, as desired. In the embodiment shown in FIGS. 1 and 2, biasing member 36 is a mechanical spring, while biasing member 38 is an air spring.

A plurality of biasing members 36 and/or 38 are appropriately positioned as desired in molding system 10 between the backing plate 32 and support member 34 in order to uniformly bias the ejector frame relative to the support member throughout its length and width.

Figure 2:
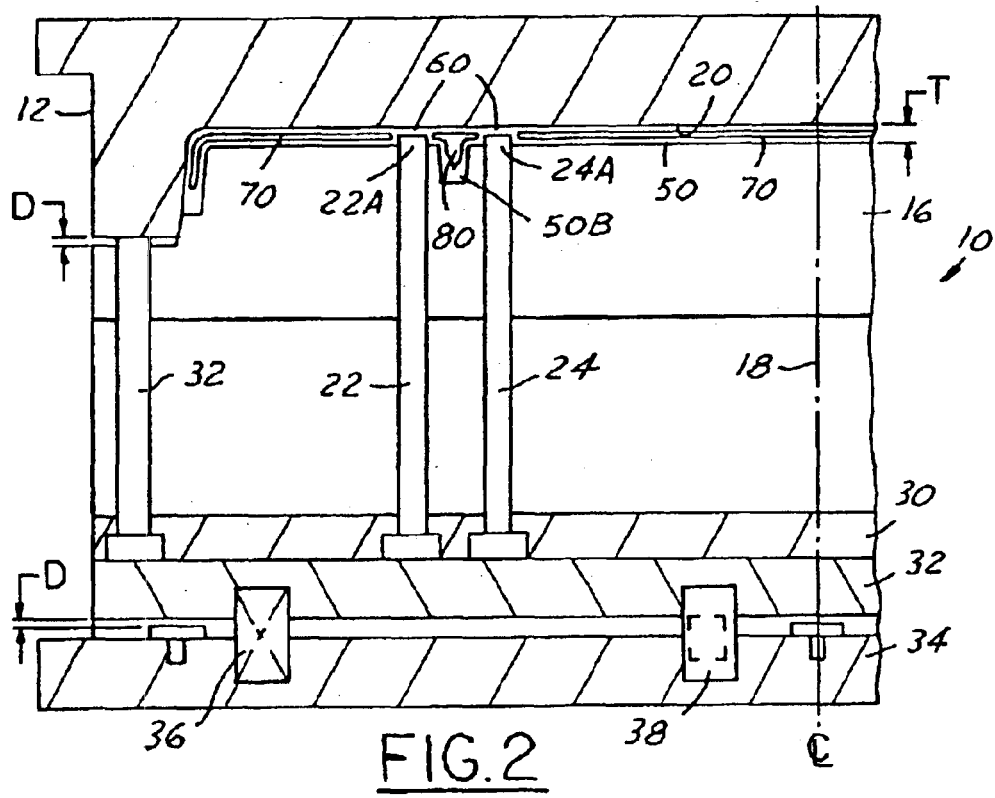
FIG. 2 is a schematic diagram of the mold shown in FIG. 1 at a step in the inventive process.

In the embodiment shown in FIGS. 1 and 2, the plastic article or product 50, which is to be produced in the mold cavity 20, has a large, flat or thin section 50A, one or more elongated rib members 50B, and flange members 50C at one or more of the sides or edges. The mold 12, in particular, is a telescoping mold, that is a vertical flash mold, which does not produce any flash material on the edges of the molded product.

In accordance with the process of the present invention, a quantity of plastic material is injected into the mold cavity 20. The plastic material is injected through a hot drop and nozzle from the injection molding machine (not shown). A shut off valve is provided in the nozzle or in the machine adjacent the nozzle in order to stop the flow of plastic material as desired in accordance with the inventive molding process.

Once the mold is closed and the plastic material is injected into the mold cavity 20, the ejector frame becomes pressurized from the biasing members 36, 38. Thereafter, a gas, such as nitrogen, is injected under pressure into the plastic material in the mold cavity using conventional gas injection techniques. The gas pressure will permeate the thin wall thickness of the material 50 in the mold cavity 20 and force the core member 16 of the mold 12 away from the cavity member 14. This results in a slight opening of the mold, as shown in FIG. 2.

As the core member 16 moves relative to the cavity member 14, the ejector pins remain in place. In this manner, where the upper ends or heads 22A and 24A of the ejector pins 22 and 24 are located, the thickness of the plastic material and provided plastic products will remain at the original thickness or depth of the mold cavity 20. These areas are indicated by the reference numeral 60 in FIG. 2. The injected gas, however, migrates or permeates into all of the other portions of the plastic material in the mold cavity, forming hollow portions 70 in the thin, flat wall thicknesses and hollow portions 80 in the rib member(s). The solid areas 60 which remain in the molded part provide the rigidity and stiffness required for the molded plastic article or product.

The gas pressure in the plastic material and resulting increase in the overall thickness of the molded part 50 moves the core member 16 a distance "D" (FIG. 2). Similarly, the backing plate member 32 and support member 34 are separated the same distance "D", again as shown in FIG. 2. The mold can be allowed to open in any conventional manner, such as by dropping the clamping pressure and using the gas pressure in the ribs 50B to force the mold open. An increase or decrease in the gas pressure can determine how far the mold will open.

Figure 5A:
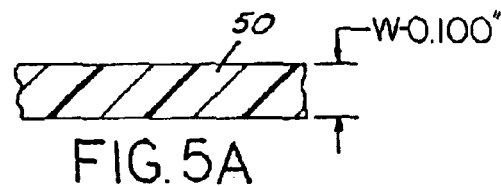
FIGS. 5A and 5B illustrate an exemplary use of the present invention.
Figure 5B:
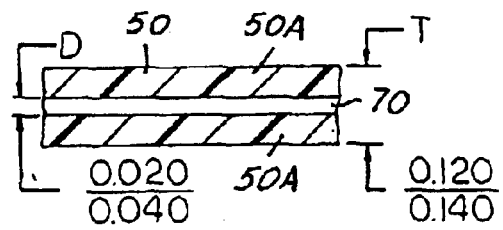

For example, for a plastic part having an original width "W" (FIG. 1) of 0.100 inches can result in a final wall thickness "T" (FIG. 2) of 0.120–0.140. This means that the thickness of the hollow section 70 in the walls of the plastic part 50 is between 0.020–0.040 inches. This is also shown in FIGS. 5A and 5B. The hollow sections also will be centrally located within the walls 50A of the molded part 50.

Also, the internal gas pressure will push or force the plastic material against the walls of the mold cavity and therefore provide better surface and part definition, as well as allowing the molded part to cool faster and have a decrease in cycle time. With the invention, it is possible to have as much as 50%–80% of void areas in the moldings, with the gas pushing the plastic material over a substantial area of the mold cavity against both the core and cavity portions of the mold.

It is also possible to utilize microswitches or pressure sensors in the molding system 10 which act to limit the opening "D" of the two mold members. In this manner, the mold core member 16 can only be opened a predetermined amount before it is prevented from opening any further.

Figure 4:
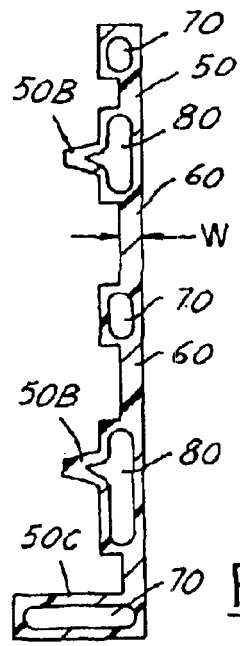
FIG. 4 is a cross-sectional view of the subject matter of FIG. 3, the cross-section being taken along line 4—4 in FIG. 3.

A typical cross-section of a molded article or product 50 in accordance with the present invention is shown in cross-section in FIG. 4. The portions or areas 60 where the ejector pins were located maintain the original wall thickness "W" of the mold cavity. The rib members 50B contain hollow portions 80, while the remainder of the product 50 contain hollow cavities 70.

With use of the present molding process, any conventional plastic injection molding machine can be utilized. In such machines, the mold 12 is typically positioned with the mold members 14 and 16 positioned in a vertical manner such that the mold cavity opens and closes along a horizontal axis.

The gas pressure in the mold cavity is held until the product cools and solidifies. At this point, the product is self-supporting. The gas pressure in the plastic part is then relieved in a conventional manner, such as by venting or exhausting, and the mold is opened and the part removed or ejected. In this regard, there are many mechanisms and systems known for relieving the gas pressure in the mold, i.e. venting or exhausting the gas from the mold, and any conventional system and method can be utilized. For example, gas can be vented back through the gas conduit or the nozzle can be backed off from the bushing creating a "sprue break." Also, the solidified or self-supporting plastic molded articles are typically assisted in being removed from the mold by ejector pins.

A term "gas" used herein means any gas body gaseous during normal temperature and pressure, such as nitrogen, carbon dioxide, and air. Preferably, the gas is an inert material, such as nitrogen or carbon dioxide. The gas can be provided from any conventional source, such as a storage tank, bottled gas, or the like. It is also possible in accordance with the present invention to utilize another fluid, such as water, in place of the gas. These other fluid systems are known in the art and do not need to be discussed in more detail here.

It is also to be understood that any conventional injection molding system could be utilized in transporting the molded plastic material from an injection molding machine or nozzle to the mold cavity 20. For example, a hot runner system or a cold runner system, with one or, more manifolds and a plurality of bushings could be utilized. Other systems and mechanisms known in the art could also be utilized.

The present invention can be used with all types of plastic materials, particularly thermal plastic materials, which generally may be injection molded. These materials can be, for example, low or high density polyethylene, polyurethane, polypropylene, polystyrene, acrylonitrile butadiene styrene (ABS) resin, SAN resin, polyvinyl chloride, polymethyl methacrylate, and the like. Materials such as polycarbonate, polyester, acetyl, polyacetyl and nylon also may be used, as well as ethylene copolymers such as ethylene-vinyl acetate copolymer, ethylene-ethyl acrylate copolymer, and the like. Furthermore, any of these resins may contain fillers, such as glass fiber, powdered glass, calcium carbonate, calcium sulfate, talc, mica, and the like.

The gas is injected into the plastic material in the mold cavity 20 at a pressure higher than the plastic injection pressure and typically at a much higher pressure. For example, the initial plastic injection fill pressure can be 100–200 psi, which will normally increase to 500–1000 p.s.i. or higher when it is packed. The gas injection could be 1000–1500 psi (if, for example, the plastic material was polypropylene) and 3000–7000 psi (if, for example, engineering grade resins were used). In general, the pressure of the gas should be sufficient to provide a commercially acceptable surface and finish on the plastic article or product 50.

The distance that the mold 12 is opened preferably should be controlled or limited in order to control the migration of the plastic into the nominal wall thickness. Also, a drop of the clamping pressure to zero could possibly result in only the rib expanding in accordance with the elasticity of the plastic material.

While the invention has been described in connection with one or more embodiments, it is to be understood that the specific mechanisms, processes and procedures which have been described are merely illustrative of the principles of the invention, numerous modifications may be made to the methods and apparatus described without departing form the spirit and scope of the invention as defined by the appended claims.

What is claimed is:

1. A process for forming a plastic article by gas-assisted plastic injection molding comprising the steps of:
    providing a mold with a first mold member and a second mold member, and an article defining cavity formed between said first and second mold members;
    providing a plurality of post members with first ends positioned in said second mold member and in communication with said mold cavity and second ends positioned in a biased frame member;
    injecting a quantity of plastic material into said mold cavity;
    injecting a pressurized gas into the plastic material in said mold cavity;
    opening said mold cavity by moving said second mold member away from said first mold member, thereby forming at least one hollow portions in a predetermined area in said plastic material by said gas; and
    maintaining the original positions of said first ends of said post members in said mold cavity, at least one of said post members being positioned in said predetermined area, thereby forming at least one solid portions in said molded plastic article within said predetermined area.

2. The process as described in claim 1 wherein said gas is nitrogen.

3. The process as described in claim 1 wherein said frame member is biased by a plurality of spring members.

4. The process as described in claim 1 further comprising the steps of maintaining the gas pressure in said mold cavity until the plastic article is self-supporting, and thereafter exhausting the gas from the article in the mold cavity and removing the completed article from the mold.

5. The process as set forth in claim 1 wherein a plurality of hollow portions are formed in said plastic material and a plurality of solid portions are formed in said molded plastic article within said predetermined area.

6. The process as set forth in claim 1 wherein said first ends of said post members are in alignment with one of the surfaces of said mold cavity prior to the opening of said mold cavity and not in alignment with said one of the surfaces subsequent to opening of said mold cavity.

7. The process as set forth in claim 1 wherein said mold is a telescoping vertical flash mold.

8. A system for forming a plastic article by gas-assisted injection molding comprising;
    an injection molding machine;
    a mold positioned in said injection molding machine, said mold having a first mold member and a second mold member and a mold cavity between said first and second mold members;
    a plurality of post members positioned on a biased frame member and having first ends positioned in said first mold member and in communication with said mold cavity;
    said first mold member being moveable by the injection of pressurized gas into the plastic material in said mold cavity, the pressurized gas adapted to form at least one hollow areas in a predetermined area in said plastic article; and said post members adapted to remain in position when said first mold member is moved by said pressurized gas, at least one of said post members being positioned in said predetermined area, thereby forming solid areas in the plastic article within said predetermined area.

9. The apparatus as set forth in claim 8 wherein a plurality of hollow portions are formed in said plastic material and a plurality of solid portions are formed in said molded plastic article within said predetermined area.

10. The apparatus as set forth in claim 8 wherein said first ends of said post members are in alignment with one of the surfaces of said mold cavity prior to the opening of said mold cavity and not in alignment with said one of the surfaces subsequent to opening of said mold cavity.

11. The apparatus as set forth in claim 8 wherein said mold is a telescoping vertical flash mold.

* * * * *